(12) United States Patent
Liu et al.

(10) Patent No.: US 12,241,431 B1
(45) Date of Patent: Mar. 4, 2025

(54) LASER HARDENED PATTERN ARRAY IN CYLINDER BORES

(71) Applicant: GM Global Technology Operations LLC, Detroit, MI (US)

(72) Inventors: Yi Liu, Troy, MI (US); Qigui Wang, Rochester Hills, MI (US); Richard L. Metcalf, Okemos, MI (US); Angela Zsidi Alksninis, Oxford, MI (US); Devin R. Hess, Clarkston, MI (US); Purushotham Kunduru, Macomb, MI (US); Cherng-chi Chang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/586,986

(22) Filed: Feb. 26, 2024

(51) Int. Cl.
| | |
|---|---|
| *F02F 7/00* | (2006.01) |
| *B23K 26/352* | (2014.01) |
| *C21D 1/09* | (2006.01) |
| *B23K 101/00* | (2006.01) |
| *B23K 103/06* | (2006.01) |
| *F02F 1/00* | (2006.01) |

(52) U.S. Cl.
CPC .......... *F02F 7/0085* (2013.01); *B23K 26/352* (2015.10); *C21D 1/09* (2013.01); *B23K 2101/006* (2018.08); *B23K 2103/06* (2018.08); *F02F 2001/008* (2013.01)

(58) Field of Classification Search
CPC   F02F 7/0085; F02F 2001/008; B23K 26/352; B23K 2103/06; B23K 2101/006; C21D 1/09
USPC ...................................................... 123/193.2
See application file for complete search history.

(56) References Cited

U.S. PATENT DOCUMENTS

| | | |
|---|---|---|
| 2,797,289 A | 6/1957 | Georgen |
| 3,476,020 A | 11/1969 | Fangman |
| 6,024,913 A | 2/2000 | Ogawa et al. |
| 6,673,304 B2 | 1/2004 | Ito et al. |

FOREIGN PATENT DOCUMENTS

| | | | |
|---|---|---|---|
| WO | WO-2017049982 A1 | * 3/2017 | |
| WO | WO-2022265639 A1 | * 12/2022 | ........... B32B 15/013 |

* cited by examiner

*Primary Examiner* — Lindsay M Low
*Assistant Examiner* — Omar Morales
(74) *Attorney, Agent, or Firm* — Vivacqua Crane, PLLC

(57) ABSTRACT

An engine block for a vehicle includes a bore surface defining a cylinder bore. The bore surface exhibits a first microstructure and includes a pattern of a plurality of cycloidal features formed in the bore surface. The plurality of cycloidal features each exhibit a first length in a first axis and a second length in a second axis arranged 90 degrees from the first axis. The plurality of cycloidal features also exhibit a ratio of the first length to the second length in a range of 1:1.5 to 1.5:1. The plurality of cycloidal features further exhibit a second microstructure including tempered martensite, wherein the second microstructure is different from the first microstructure. The engine block is included in a vehicle. The cycloidal features are formed with a laser.

20 Claims, 6 Drawing Sheets

LASER HARDENED PATTERN ARRAY IN CYLINDER BORES

BACKGROUND

In internal combustion engines for heavy duty vehicles, it is generally desirable to increase the hardness and reduce the wear rate of the gray cast iron cylinder bore surfaces, particularly in the region of piston ring travel. Hardening may be accomplished through heating and then quenching the surfaces of the cylinder bores. The process develops a relatively fine martensitic structure at the cylinder bore surface. The fine martensitic structure provides an increase in hardness, resulting in an increase in wear resistance and a reduction in friction that may be caused by surface wear. However, hardening is known to lead to brittleness. In addition, the martensitic structure leads to volume expansion that creates stresses, particularly in regions where there are abrupt phase transitions from the relatively softer austenite to the relatively harder martensite during cooling in heat treatment of the gray cast iron, in which graphite flakes are commonly found after formation. The stress induced by the volume expansion of martensite transformation may lead to crack initiation and propagation in the surface of the cylinder bore.

Methods of heating include, for example, induction hardening and flame treatment. In induction hardening, an induction coil is passed into each cylinder bore. Induction hardening provides a greater ability to control the regions where the cylinder bore surfaces are hardened over methods like flame treatment. Depending on the geometry of the induction coils used in induction heating, the regions hardened may exhibit various geometries and patterns on the surface of the cylinder bore. In addition, by treating only particular regions, brittleness in the entire cylinder bore is reduced. However, stress fractures are not eliminated with induction hardening and induction hardening requires careful placement of the induction coils in the bores, which can be difficult to control, particularly if multiple cylinders are being treated simultaneously.

Thus, while the induction heating methods of hardening cylinder bore surfaces achieve their intended purpose, there is a need for new and improved methods for hardening cylinder bore surfaces.

SUMMARY

According to various aspects, the present disclosure relates to an engine block for a vehicle. The engine block includes a bore surface. The bore surface defines a cylinder bore and the bore surface exhibits a first microstructure. A pattern of a plurality of cycloidal features formed in the bore surface. The plurality of cycloidal features each exhibit a first length in a first axis and a second length in a second axis arranged 90 degrees from the first axis and the plurality of cycloidal features exhibit a ratio of the first length to the second length in a range of 1:1.5 to 1.5:1. In addition, the plurality of cycloidal features exhibits a second microstructure including tempered martensite and the second microstructure is different from the first microstructure.

In embodiments of the above, the plurality of cycloidal features extend a depth into the bore surface in the range of 500 micrometers to 1 millimeters in depth.

In any of the above embodiments, the plurality of cycloidal features are arranged in a plurality of rows and the cycloidal features of each row are a first distance apart. In further embodiments, the plurality of cycloidal features in adjacent rows are offset along the first axis.

In any of the above embodiments, a diagonal distance between the plurality of cycloidal features in a third axis positioned in the range of 15 to 45 degrees to the first axis is greater than the first distance.

In embodiments of the above, the first distance is a minimum of 2.5 millimeters and the diagonal distance is a minimum of 3.2 millimeters.

In any of the above embodiments, cycloidal features are round and exhibit a ratio of the first length to the second length of 1:1.

In any of the above embodiments, the bore surface is formed from at least one of gray cast iron and compact cast iron. In further embodiments, the first microstructure includes pearlite and cementite matrix including graphite flakes dispersed in the matrix.

In any of the above embodiments, the bore surface includes an upper portion and a lower portion and the pattern of the plurality of cycloidal features are located in the upper portion of the bore surface.

According to various additional aspects, the present disclosure relates to a vehicle including an internal combustion engine, including the engine block as described in the various aspects above. The engine block includes a bore surface defined in the internal combustion engine, wherein the bore surface defines a cylinder bore. The bore surface exhibits a first microstructure and the bore surface includes an upper portion and a lower portion. The internal combustion engine also includes a piston including a piston ring mounted on the piston, wherein the piston ring reciprocally contacts at least a portion of the upper portion of the bore surface. A pattern of a plurality of cycloidal features are formed in the bore surface. The plurality of cycloidal features each exhibit a first length in a first axis and a second length in a second axis arranged 90 degrees from the first axis and the plurality of cycloidal features exhibit a ratio of the first length to the second length in a range of 1:1.5 to 1.5:1. The plurality of cycloidal features also exhibit a second microstructure including tempered martensite and the second microstructures is different from the first microstructure.

In embodiments of the above, the plurality of cycloidal features extend a depth into the bore surface in the range of 500 micrometers to 1 millimeters in depth.

In any of the above embodiments, the plurality of cycloidal features are arranged in a plurality of rows and the cycloidal features of each row are a first distance apart. In further embodiments, the plurality of cycloidal features in adjacent rows are offset along the first axis.

In any of the above embodiments, a diagonal distance between the plurality of cycloidal features in a third axis positioned in the range of 15 to 45 degrees to the first axis is greater than the first distance. In further embodiments, the first distance is a minimum of 2.5 millimeters and the diagonal distance is a minimum of 3.2 millimeters.

In any of the above embodiments, the cycloidal features are round and exhibit a ratio of the first length to the second length of 1:1.

In any of the above embodiments, the bore surface is formed from at least one of gray cast iron and compact cast iron. In further embodiments, the first microstructure includes a pearlite and cementite matrix including graphite flakes dispersed in the matrix.

According to various additional aspects, the present disclosure relates to a method of forming a patterned array on a cylinder bore surface. The method includes impinging a bore surface with a laser. The bore surface defines a cylinder bore and the bore surface exhibits a first microstructure. The method also includes forming with the laser a pattern of a plurality of cycloidal features formed in the bore surface. The plurality of cycloidal features each exhibit a first length in a first axis and a second length in a second axis positioned 90 degrees from the first axis and exhibit a ratio of the first length to the second length in a range of 1:1.5 to 1.5:1. Further, the plurality of cycloidal features exhibits a second microstructure different from the first microstructure and the second microstructure includes tempered martensite.

BRIEF DESCRIPTION OF DRAWINGS

The drawings described herein are for illustration purposes only and are not intended to limit the scope of the present disclosure in any way.

DETAILED DESCRIPTION

Figure 1A:
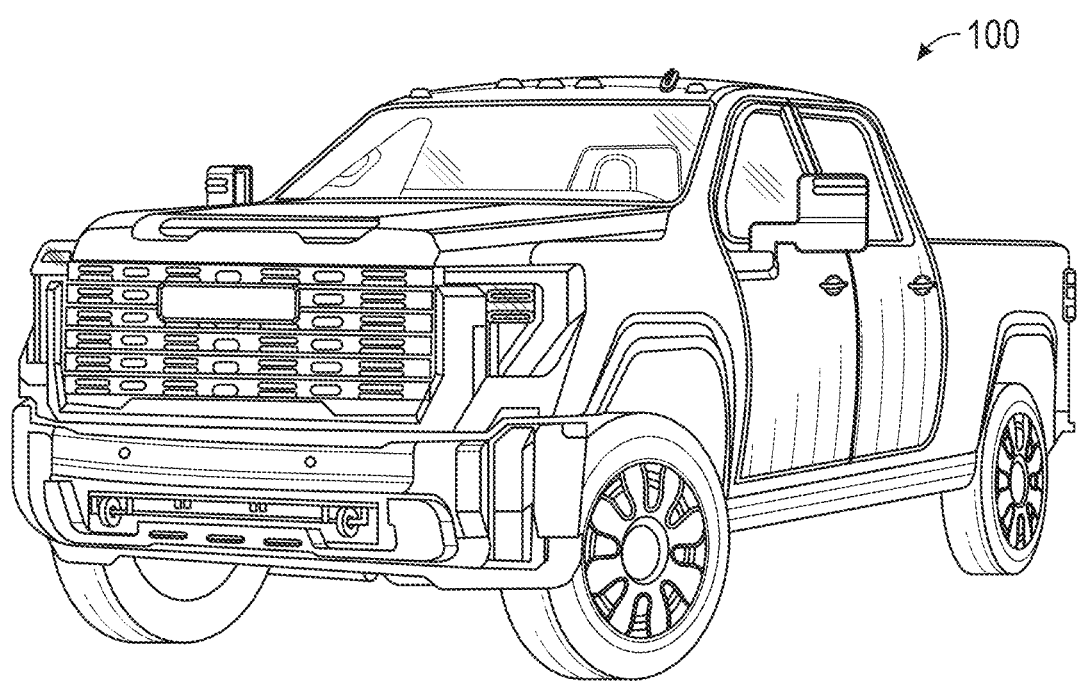
FIG. 1A illustrates a vehicle including an engine block, according to embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure relates to a laser hardened patterned array of cycloidal features formed in a cylinder bore of an engine block for a vehicle. In addition, the present disclosure relates to a vehicle including an internal combustion engine including an engine block with a cylinder bore including a laser hardened patterned array of cycloidal features. The present disclosure further relates to a method of forming the laser hardened patterned array of cycloidal features in a cylinder bore.

As used herein, the term "vehicle" is not limited to trucks or automobiles. While the present technology is described primarily herein in connection with vehicles including internal combustion engines, the technology is not limited to internal combustion vehicles, but also hybrid electric vehicles as well. In addition, the concepts can be used in a wide variety of applications, such as in connection with components used in motorcycles, mopeds, locomotives, aircraft, marine craft, heavy equipment, construction vehicles, construction equipment, and other vehicles, as well as in other applications utilizing engines, such as in lawn mowers, concrete mixers, string trimmers, chainsaws, portable and fuel based power generators such as gasoline or diesel generators as well as sterling engines. Further applications include wear surfaces of machine components formed from gray cast iron, ductile cast iron, compact gray iron, and steels.

Figure 1B:
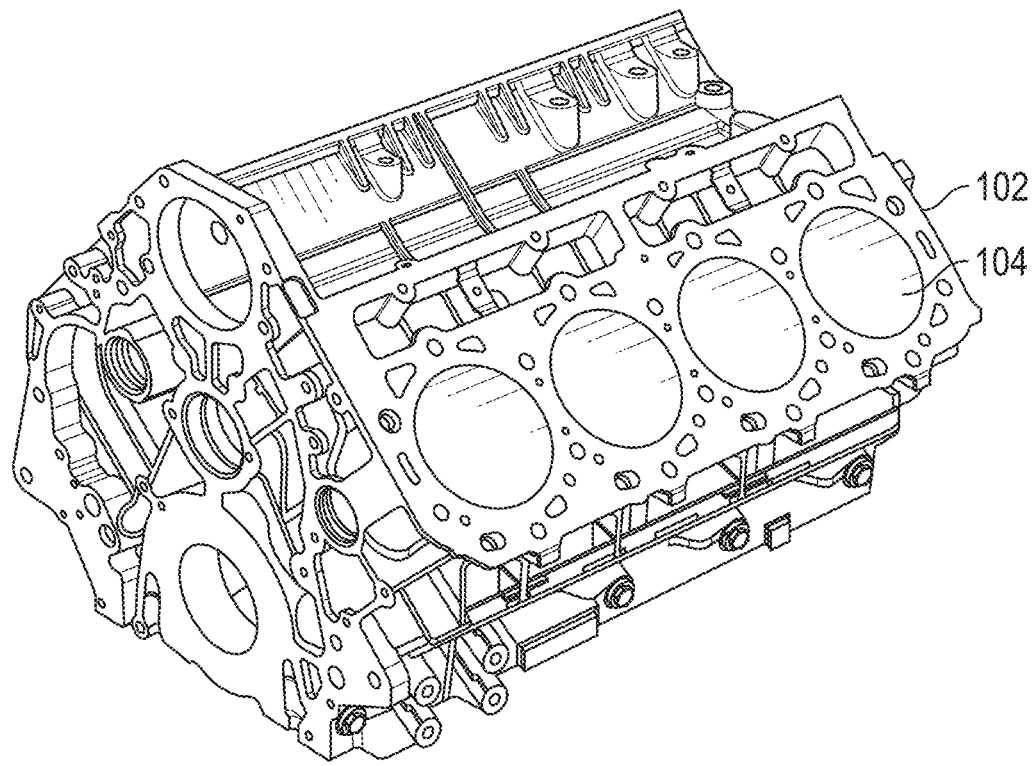
FIG. 1B illustrates an engine block having a plurality of cylinder bores defined therein, according to embodiments of the present disclosure.

FIG. 1A illustrates a vehicle 100 including an internal combustion engine, which includes an engine block, such as the engine block 102 illustrated in FIG. 1B. The engine block 102 includes at least one cylinder bore 104 defined therein. In embodiments, the engine block 102 may include up to twelve (12) cylinder bores 104, or more. The illustrated engine block 102 defines eight (8) cylinder bores 104. While the cylinder bores 104 are arranged in a "V" in the illustrated embodiment, the cylinder bores 104 may alternatively be arranged inline or flat. The engine block 102 may also define coolant passages, exhaust passages, support cam shafts, and house a portion of the crankcase. In embodiments, the engine block 102 is formed from gray cast iron or other materials, such as ductile cast iron, compact gray iron and steels. In embodiments, a typical gray cast iron includes 2.5 percent by weight carbon to 4 percent by weight carbon, 1 percent by weight to 3 percent by weight silicon, 0.2 percent by weight to 1 percent by weight manganese, 0.02 percent by weight to 0.25 percent by weight sulfur, and 0.02 percent by weight to 1 percent by weight phosphorus and the remaining percent by weight iron up to 100 percent by weight, including all values and ranges within the range disclosed above. Other elements, such as tin, copper, chromium, molybdenum, and nitrogen, may be present in the composition in an amount of up to 3 percent by weight, such as in the range of 0.001 percent by weight to 3 percent by weight. In addition, impurities introduced by the feedstocks, manufacturing environment, and manufacturing equipment, may be present in the gray cast iron in an amount of up to 0.05 weight percent.

Figure 2A:
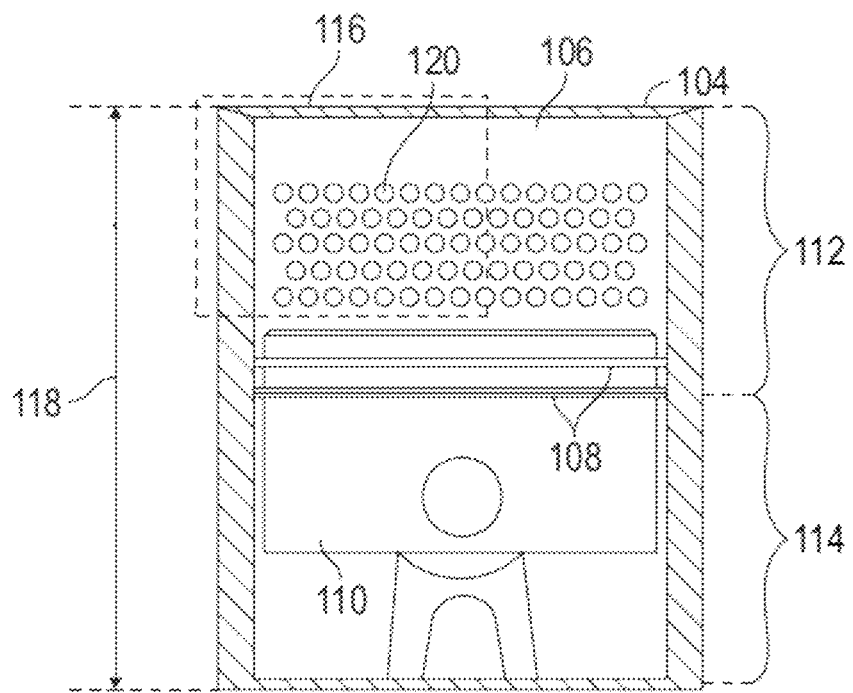
FIG. 2A illustrates a cross section of a cylinder bore, according to embodiments of the present disclosure.
Figure 2B:
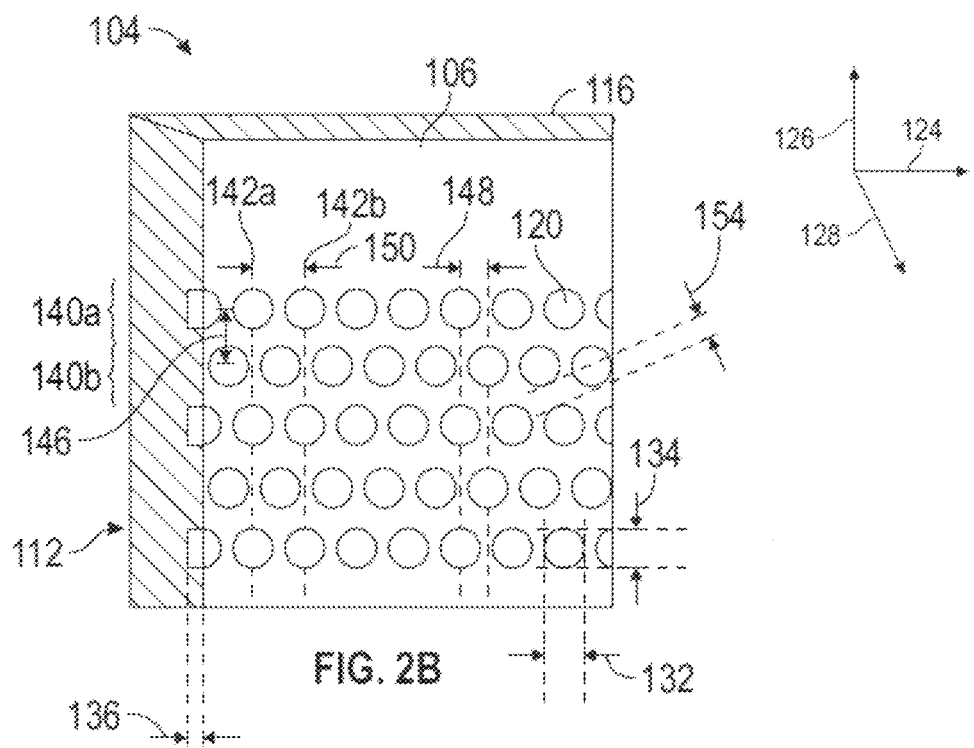
FIG. 2B illustrates a close-up of the hardened array pattern of FIG. 2A, according to embodiments of the present disclosure.

FIGS. 2A and 2B illustrate a bore surface 106 within a cylinder bore 104 including a piston 110 therein. The bore surface 106 defines the cylinder bore 104 opening in the engine block 102 illustrated in FIG. 1B. The bore surface 106 exhibits a first microstructure. The microstructure includes the structure of the material at a microscopic level and is defined by, but is not limited to, at least one or more of the following: crystalline structure, amorphous phases, matrix phases, domains within the matrix phases, defects, impurities and grain boundaries. In the case of gray cast iron, the microstructure includes a pearlite and cementite matrix with graphite flakes of 5 micrometers to 200 micrometers in length dispersed in the matrix. The graphite is present in the matrix in the range of 6 percent by volume to 10 percent by volume of the total volume of the gray cast iron.

The cylinder bore 104 includes an upper portion 112 and a lower portion 114. The upper portion 112 extends down from the top 116 of the cylinder bore 104 a distance of up to one third of the entire length 118 of the cylinder bore 104. A patterned array of a plurality of cycloidal features 120 is formed in the upper portion 112 of bore surface 106, particularly in the region of the cylinder bore 104 where the piston rings 108 mounted on and carried by the piston 110 interact with the bore surface 106 as the piston 110 reciprocates in the cylinder bore 104. Cycloidal, as understood herein, is reference to a shape resembling a circle, or rounded. In embodiments, the cycloidal shape is a circle or, alternatively, may be an oval or ellipse shape. In embodiments, the plurality of cycloidal features 120 may also be formed in the lower portion 114 of the bore surface 106. In embodiments, the top of the patterned array of the plurality of cycloidal features 120 is formed a distance of 11 millimeters to 14 millimeters from the top 116 of the cylinder bore 104. Further, in embodiments, the bottom of the patterned array of the plurality of cycloidal features 120 extends down to a distance of 34 millimeters to 37 millimeters from the top 116 of the cylinder bore 104.

In a first axis 124, the cycloidal feature 120 exhibits a first length 132. The first length 132 may be in the range of 2 millimeters to 4 millimeters, including all values and ranges therein. In the second axis 126, the cycloidal feature 120 exhibits a second length (or height) 134. The second length 134 may be in the range of 2 millimeters to 4 millimeters, including all values and ranges therein. In embodiments, such as the illustrated embodiment, the cycloid features 120 exhibit a first length 132 to second length 134 ratio in a range of 1:1. In additional or alternative embodiments, the plurality of cycloidal features 120 may exhibit a first length 132 to second length 134 ratio in a range of 1:1.5 to 1.5:1, including all values and ranges therein. In embodiments, the first axis 124 is parallel to the top 116 of the cylinder and the second axis 126 is perpendicular (arranged at 90 degrees) to the first axis 124. In addition, the plurality of cycloidal features 120 extend a depth 136 into the bore surface in the range of 500 micrometers to 1 millimeters, including all values and ranges therein.

The plurality of cycloidal features 120 are arranged in a number of rows 140a, 140b, which, in embodiments, are parallel to the first axis 124. The rows 140a, 140b are a first distance 146 apart, measured along the second axis 126 from the center points of the cycloidal features 120. In embodiments, the first distance 146, is in the range of 4.5 millimeters to 8 millimeters, including all values and ranges therein, such as 5.5 millimeters to 6.5 millimeters, and in further embodiments 6 millimeters.

Adjacent cycloidal features 120 in a given row 140a, 140b are arranged a second distance 150 apart. The second distance 150, measured from the center points of the adjacent cycloidal features 120, is in the range of 4.5 millimeters to 7 millimeters, including all values and ranges therein such as 5.5 millimeters to 6.00 millimeters, and in further embodiments 5.75 millimeters. In addition, the cycloidal features 120 of adjacent rows 140a, 140b are shifted, or offset, a third distance 148, measured from the center points of the cycloidal features 120. In embodiments, the third distance 148 is in the range of range of 2 millimeters to 5 millimeters, including all values and ranges therein, such as 2.75 millimeters to 3.0 millimeters, and in further embodi- ments 2.875 millimeters. Further, a diagonal distance 154 between the plurality of cycloidal features 120 in a third axis 128 positioned in a range of 15 to 50 degrees to the first axis 124 is measured from the edges of the plurality of cycloidal features 120. The diagonal distance 154 is in the range of 3.2 millimeters to 6 millimeters, including all values and ranges therein, such as in the range of 3.2 millimeters to 6 millimeters.

Figure 2C:
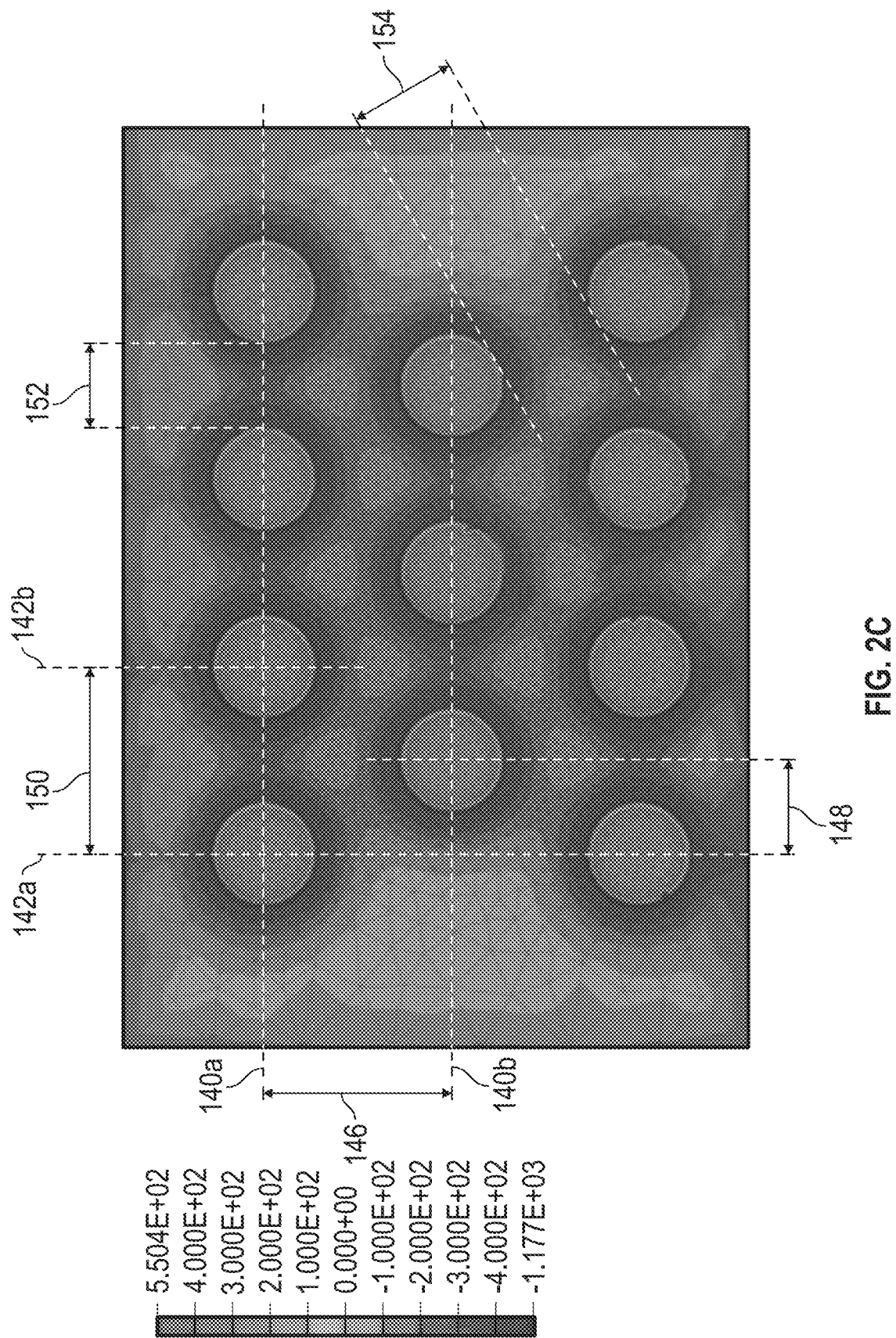
FIG. 2C illustrates a close-up of the hardened array pattern and distribution of stresses in the hardened array pattern of FIG. 2A, according to embodiments of the present disclosure.

In addition, and with reference to FIG. 2C, in embodiments, the minimum distance 152 between adjoining cycloidal features 120a, 120b, measured edge to edge is no less than 2.5 millimeters and the minimum diagonal distance 154 between cycloidal features 120c, 120d measured edge to edge is 3.2 millimeters. Distances of less than 2.5 millimeters between adjacent cycloidal features 120a, 120b in a given row 140a, 140b, and diagonal distances of less than 3.2 millimeters, may result in tensile stresses imparted by the formation of the martensite transformation within the cycloidal features 120 that are greater than the tensile stresses of the gray cast iron, which may further result in tensile cracking of the gray cast iron between adjoining cycloidal features 120. The minimum distance between the cycloidal features depends on the stress distribution generated by the volume expansion of the martensite phase transformation. The gradation of FIG. 2C illustrates an embodiment of a calculated distribution of Signed von Mises stresses in the bore surface 106 between the cycloidal features 120. Relatively higher positive stresses are exhibited in the cycloidal features 120 and relatively higher negative stresses are seen surrounding the cycloidal features 120. In this embodiment, the minimum distance between cycloidal features 120a, 120b measured edge to edge in a given row 140a, 140b is 2.5 millimeters and the diagonal distance between the cycloidal features 120c, 120d is 3.5 millimeters. However, this minimum distance may be altered depending on starting material composition, cycloidal feature size, and processing parameters.

The plurality of the cycloidal features 120 exhibit a second microstructure that is different from the first microstructure. The second microstructure mainly includes martensite, retained austenite and carbides. The tempered martensite after tempering is expected to be present in an amount of 50 percent to 90 percent by volume of the total volume of each cycloidal feature 120, depending on the cooling rate. The second microstructure may also include a small amount of bainite. For gray cast iron, the hardness of the first microstructure of the untreated bore surface 106 may be in the range of 200 Hv to 270 Hv, whereas the hardness of the second microstructure of the Vickers hardened cycloidal features 120 may be in the range of 590 Hv to 800 Hv, as measured by Vickers testing protocol ISO 6507 at a load of 500 grams force for a dwell time of typically 5 s, or 10 s.

Figure 3:
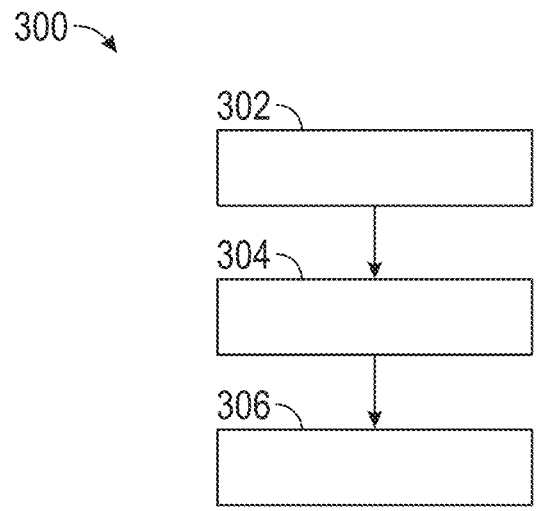
FIG. 3 illustrates a method of forming a hardened pattern array, according to embodiments of the present disclosure.
Figure 5:
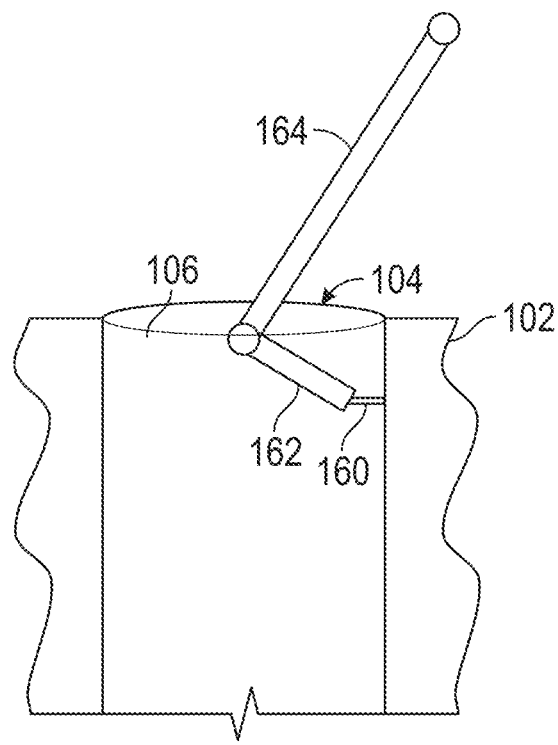
FIG. 5 illustrates a system for forming a laser hardened patterned array of cycloidal features.

Reference is made to FIG. 3 illustrating a method 300 of forming an engine block, and particularly, the hardened patterned array of cycloidal features 120 described above, with further reference to FIGS. 1A through 2C. At block 302, a bore surface 106 of a cylinder bore 104 in an engine block 102 is impinged with light 160 emitted from one or more lasers 162, illustrated in FIG. 5. The laser 162 is mounted on a robotic arm 164 allowing for movement of the laser 162 in the cylinder bore 104 and to allow the laser 162 to perform additional functions. In embodiments, the light 160 emitted from the laser 162 generated from a 5 Kilowatt laser machine exhibits one or more electromagnetic wavelengths in the range of 1040 nanometers to 1120 nanometers, including all values and ranges therein. The laser 162 heats the bore surface 106 and converts the microstructure of the bore surface 106 from a first microstructure, as described above, to a second microstructure, also described above. In embodiments, the rate of heating may be adjusted by adjusting the power of the laser, the laser travel speed, and the laser light 160 beam diameter, and dwell time. The rate of heating may be determined based on thermal stresses induced by the volume expansion due to martensite transformation (typically understood to be in the range of 2 percent to 4 percent volume expansion) and referencing the isothermal transformation diagrams to determine the amount of martensite phase transformation to control the rate of volume expansion due to martensite formation. Temperatures at the bore surface 106 for forming martensite using the laser are, in embodiments, in the range of 800 degrees Celsius to 1200 degrees Celsius, including all values and ranges therein. Overheating, heating the bore surface 106 at laser power that is too high, and temperatures that are too high, and incipient melting, results in undesirable microstructure formation.

At block 304 the laser a pattern of a plurality of cycloidal features 120 are formed in the bore surface 106 exhibiting the geometry and features as described above. The hardened patterned array of the plurality of the cycloidal features 120 may be formed in all the cylinder bores 104 simultaneously using more than one laser or may be formed one at a time in each cylinder bore 104. At block 306, the features are tempered by adjusting the power of the laser and impinging each cycloidal feature 120 to be tempered with the laser. Tempering alters the size and distribution of the carbides found in the martensite and forms tempered martensite. By tempering at temperatures that are on the low end, such as temperatures at the bore surface 106 in the range of 150 degrees Celsius to 500 degrees Celsius for gray cast iron, the internal stresses may be relieved and brittleness decreased while retaining most of the hardness characteristics within the desired range. Tempering at temperatures that are too high may cause incipient melting and loss of desired microstructure. Tempering may result in a hardness of the second microstructure in the range of 490 Hv to 700 Hv, as measured by Vickers testing protocol, ISO 6507 at a load of 500 grams force.

Figure 4:
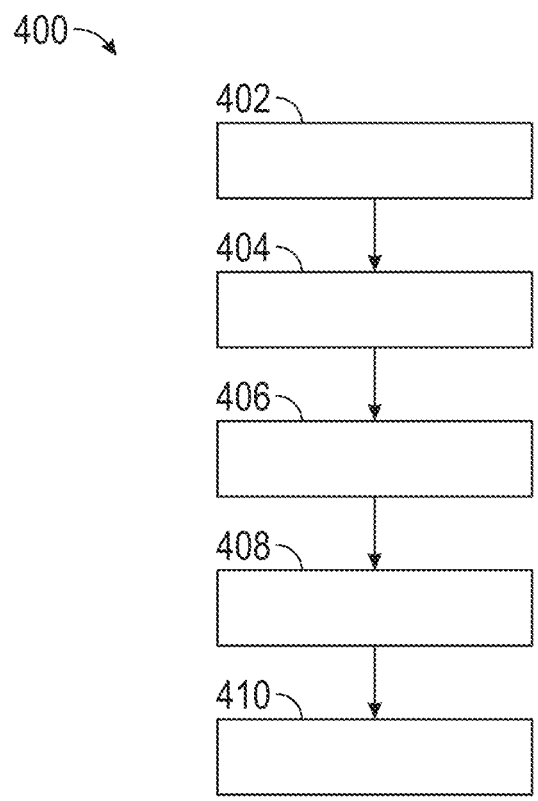
FIG. 4 illustrates a method of forming an engine block including a hardened pattern array, according to embodiments of the present disclosure.

In further embodiments, illustrated in FIG. 4 with further reference to FIGS. 1A through 3, the method 400 begins with casting, or otherwise forming, the general shape of the engine block 102 at step 402. Casting may be performed using sand casting, lost foam casting, or die casting in the case of aluminum. In sand casting, for example, sand and binders are used to make the mold. Patterns are inserted into the mold to provide various cavities and passages in the engine block, such as the cylinder bores, the coolant passages, exhaust passages, supports for the cam shaft, etc. Once the mold is formed, molten metal is poured into the mold and allowed to cool. Once the metal has solidified, the sand mold is broken down and, sometimes, the cast engine block is vibrated to remove excess sand.

After the initial casting process, at step 404 primary machining is performed. Primary machining may include processes such as grinding to achieve the required dimensions of the engine block and smooth the surfaces. At step 406 the hardened patterned array of the cycloidal features 120 are formed on the bore surface 106 of the cylinder bores 104 in the engine block 102 as described above with reference to FIG. 3. At step 408 honing is performed to obtain a desired surface finish of the cylinder bores 104 including the hardened patterned array of cycloidal features 120. At step 410 the engine block 102 may then be assembled with the other components forming the internal combustion engine, such as the pistons, cam shaft, crankshaft, etc.

Comparative Example

Figure 6A:
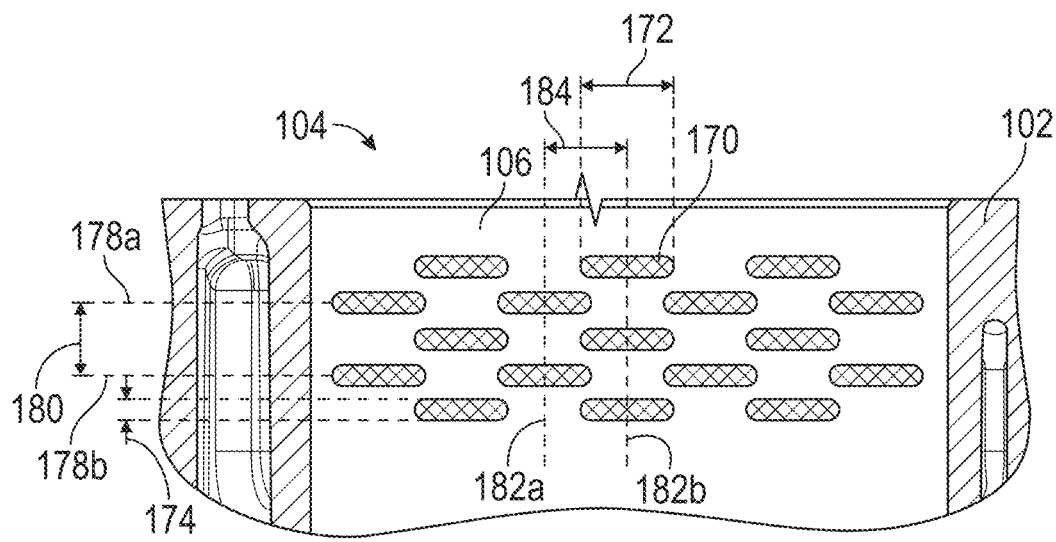
FIG. 6A illustrates a close-up of the hardened array pattern formed by induction hardening according to a comparative example.
Figure 6B:
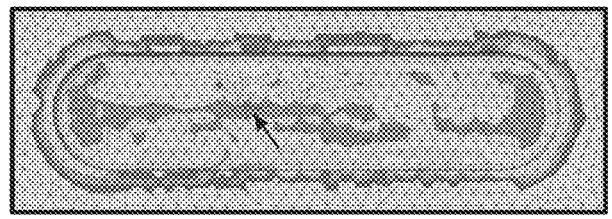
FIG. 6B illustrates the distribution of stresses in the comparative hardened array pattern on the cylinder bore surface of FIG. 6B.

FIGS. 6A and 6B illustrate a laser hardened patterned array of "pill" shaped features 170 formed on a bore surface 106. The pill shaped features 170 exhibit a length 172 of 15 millimeters and a height 174 of 3.5 millimeters providing a length to height ratio of approximately 4.29:1. The distance 180 between the rows 178a, 178b is 6 millimeters, measured center point to center point, and the distance 184 between the adjacent columns 182a, 182b is 13.48 millimeters measured center point to center point. As can be seen in FIG. 6A, the "pill" shaped features 170 is offset from the pill shaped features 170 in the adjacent rows. The formation of the pills using laser heating results in relatively higher stresses of 398 MPa forming near the center of the pill features 170 as illustrated in FIG. 6B.

Figure 7A:
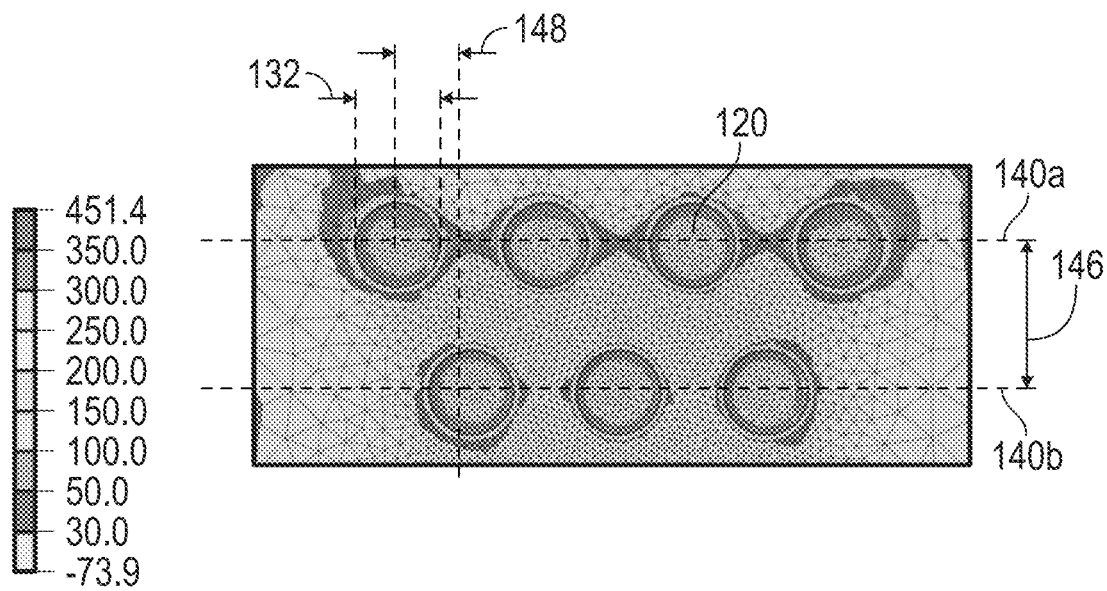
FIG. 7A illustrates the distribution of stresses in the hardened array pattern of FIGS. 2A and 2B, according to embodiments of the present disclosure.
Figure 7B:
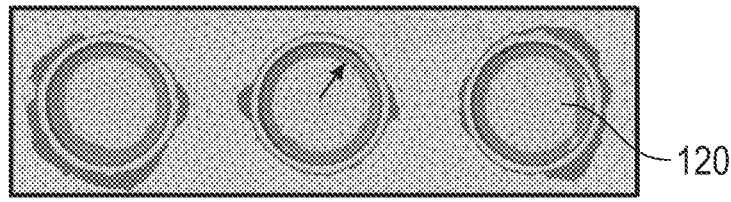
FIG. 7B illustrates the distribution of stresses in the hardened array pattern of FIG. 7A, according to embodiments of the present disclosure.

FIG. 7A and FIG. 7B, which is a close-up of FIG. 7A, illustrate an embodiment of a laser hardened patterned array of cycloidal features 120 formed on a bore surface 106 according to the present disclosure. The cycloidal features 120 exhibit a length 132 of 3.5 millimeters and second length 134 of 3.5 millimeters providing a length to height ratio of 1:1. The distance 146 between the rows 140a, 140b is 6 millimeters, measured center point to center point, and the distance 148 between the adjacent columns 142a, 142b is 2.875 millimeters measured center point to center point. As can be seen in FIG. 7A, the features 120 are offset from the features 120 in the adjacent rows 140a, 140b. The formation of the pills using laser heating results in a stress of 319 MPa forming near the edges of the cycloidal features as illustrated in FIG. 7B. It is noted that the laser hardening conditions between the comparative example and the example according to the present disclosure were relatively similar.

The cylinder bore surfaces including the pattern arrays and methods herein offer a number of advantages. These advantages include, for example, reduced risk of cracking in the gray cast iron and other engine block materials by, without being bound to any particular theory, reducing the ratio of the length to height of the cycloidal features compared to those presently used. The advantages also include an improvement in wear resistance and a reduction in oil consumption. These advantages further include for example, an improved distribution of tensile stresses in different directions in the hardened areas of the gray cast iron by, without being bound to any particular theory, reducing the ratio of the length to height of the cycloidal features compared to those presently used. Further advantages include distributing relatively high stress locations around the perimeter of the cycloidal features, particularly as the ratio of the first length and second length approaches 1:1. Yet further advantages include reduction of stresses through cycloidal feature size and spacing. Yet an additional advantage includes the ability to carefully control martensite formation through the control of the laser to control volumetric expansion, which is in the range of 2 percent to 4 percent by volume for martensite, due to the formation of the martensite phase. Yet an additional advantage includes a simplified process of laser hardening, including a reduced possibility of reheating areas and increased process control. Additionally, an advantage is avoiding overheating laser treated areas, avoiding incipient melting and obtaining a microstructure of martensite with less retained austenite.

And an additional advantage is the ability to temper the martensite after hardening and initial martensite formation by adjusting laser power.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. An engine block for a vehicle, comprising:
a bore surface, wherein the bore surface defines a cylinder bore and the bore surface exhibits a first microstructure; and
a pattern of a plurality of cycloidal features formed in the bore surface,
wherein the plurality of cycloidal features each exhibit a first length in a first axis and a second length in a second axis arranged 90 degrees from the first axis,
wherein the plurality of cycloidal features exhibit a ratio of the first length to the second length in a range of 1:1.5 to 1.5:1,
wherein the plurality of cycloidal features extend a depth into the bore surface in the range of 500 micrometers to 1 millimeters in depth,
wherein the plurality of cycloidal features exhibits a second microstructure including tempered martensite, and
wherein the second microstructure is different from the first microstructure.

2. The engine block of claim 1, wherein adjacent cycloidal features of the plurality of cycloidal features in a given row exhibit a first distance apart in the range of 4.5 millimeters to 7 millimeters measured from the center points of the adjacent cycloidal features.

3. The engine block of claim 2, wherein the plurality of cycloidal features in adjacent rows exhibit a second distance apart in the range of 4.5 millimeters to 8 millimeters measured from the center points of the plurality of cycloidal features in the adjacent rows.

4. The engine block of claim 3, wherein the cycloidal features are round and exhibit a ratio of the first length to the second length of 1:1.

5. The engine block of claim 1, wherein the bore surface is formed from at least one of gray cast iron and compact cast iron.

6. The engine block of claim 5, wherein the first microstructure includes a pearlite and cementite matrix including graphite flakes dispersed in the cementite matrix.

7. The engine block of claim 1, wherein the bore surface includes an upper portion and a lower portion and the pattern of the plurality of cycloidal features are located in the upper portion of the bore surface.

8. The engine block of claim 1, wherein the bore surface is formed of gray cast iron, wherein the plurality of cycloidal features are arranged in a plurality of rows, and adjacent cycloidal features in each row are a minimum of 2.5 millimeters apart, and wherein the plurality of cycloidal features in adjacent rows are offset in the first axis and a diagonal distance between two adjacent cycloidal features in the adjacent rows is a minimum of 3.2 millimeters.

9. The engine block of claim 1, wherein the first length of the cycloidal features are in the range of 2 millimeters to 4 millimeters and the second length of the cycloidal features are in the range of 2 millimeters to 4 millimeters.

10. The engine block of claim 1, wherein the bore surface is formed from gray cast iron and the plurality of cycloidal features exhibit a Vickers hardness of 590 Hv to 800 Hv and the remainder of the bore surface exhibits a Vickers hardness in the range of 200 Hv to 270 Hv.

11. A vehicle, comprising:
an internal combustion engine, including an engine block and a piston;
a bore surface defined in the internal combustion engine, wherein the bore surface defines a cylinder bore and the bore surface exhibits a first microstructure, and wherein the bore surface includes an upper portion and a lower portion;
a piston ring mounted on the piston, wherein the piston ring reciprocally contacts at least a portion of the upper portion of the bore surface; and
a pattern of a plurality of cycloidal features formed in the bore surface,
wherein the plurality of cycloidal features each exhibit a first length in a first axis and a second length in a second axis arranged 90 degrees from the first axis,
wherein the plurality of cycloidal features exhibit a ratio of the first length to the second length in a range of 1:1.5 to 1.5:1,
wherein the plurality of cycloidal features extend a depth into the bore surface in the range of 500 micrometers to 1 millimeters in depth,
wherein the plurality of cycloidal features exhibits a second microstructure including tempered martensite, and
wherein the second microstructure are different from the first microstructure.

12. The vehicle of claim 11, wherein adjacent cycloidal features of the plurality of cycloidal features in a given row exhibit a first distance apart in the range of 4.5 millimeters to 7 millimeters measured from the center points of the adjacent cycloidal features.

13. The vehicle of claim 12, wherein the plurality of cycloidal features in adjacent rows exhibit a second distance apart in the range of 4.5 millimeters to 8 millimeters measured from the center points of the plurality of cycloidal features in the adjacent rows.

14. The vehicle of claim 11, wherein the cycloidal features are round and exhibit a ratio of the first length to the second length of 1:1.

15. The vehicle of claim 11, wherein the bore surface is formed from at least one of gray cast iron and compact cast iron.

16. The vehicle of claim 15, wherein the first microstructure includes a pearlite and cementite matrix including graphite flakes dispersed in the matrix.

17. The vehicle of claim 11, wherein the bore surface is formed of gray cast iron, wherein the plurality of cycloidal features are arranged in a plurality of rows, and adjacent cycloidal features in each row are a minimum of 2.5 millimeters apart, and wherein the plurality of cycloidal features in adjacent rows are offset in the first axis and a diagonal distance between a cycloidal feature of the plurality of cycloidal features in a first row and an adjacent cycloidal feature of the plurality of cycloidal features in a second row adjacent to the first row is a minimum of 3.2 millimeters.

18. The vehicle of claim 11, wherein the first length of the cycloidal features are in the range of 2 millimeters to 4 millimeters and the second length of the cycloidal features are in the range of 2 millimeters to 4 millimeters.

19. The vehicle of claim 11, wherein the bore surface is formed from gray cast iron and the plurality of cycloidal features exhibit a Vickers hardness of 590 Hv and the remainder of the bore surface exhibits a Vickers hardness in the range of 200 Hv to 270 Hv.

20. A method of forming a patterned array on a cylinder bore surface, comprising:

impinging a bore surface with a laser, wherein the bore surface defines a cylinder bore and the bore surface exhibits a first microstructure;

forming with the laser a pattern of a plurality of cycloidal features formed in the bore surface, wherein the plurality of cycloidal features each exhibit a first length in a first axis and a second length in a second axis positioned 90 degrees from the first axis, wherein the plurality of cycloidal features extend a depth into the bore surface in the range of 500 micrometers to 1 millimeters in depth, wherein the plurality of cycloidal features exhibit a second microstructure different from the first microstructure, wherein the second microstructure includes martensite, and wherein the plurality of cycloidal features exhibit a ratio of the first length to the second length in a range of 1:1.5 to 1.5:1; and tempering the plurality of cycloidal features with the laser.

\* \* \* \* \*